United States Patent [19]

Katayose et al.

[11] Patent Number: 4,804,245
[45] Date of Patent: Feb. 14, 1989

[54] OPTICAL FIBER CABLE

[75] Inventors: Hiroichi Katayose; Hiroshi Yokosuka, both of Chiba; Katsuyuki Seto, Sakura, all of Japan

[73] Assignee: Fujikura Ltd., Tokyo, Japan

[21] Appl. No.: 834,079

[22] Filed: Feb. 26, 1986

[30] Foreign Application Priority Data

Mar. 4, 1985 [JP] Japan .................. 60-30535[U]

[51] Int. Cl.⁴ .................................................. G02B 6/44
[52] U.S. Cl. .................................................. 350/96.23
[58] Field of Search .................................. 350/96.23

[56] References Cited

U.S. PATENT DOCUMENTS

| | | | |
|---|---|---|---|
| 3,865,466 | 2/1975 | Slaughter | 350/96.23 |
| 4,514,058 | 4/1985 | Walton | 350/96.23 |
| 4,534,618 | 8/1985 | Bruggendieck | 350/96.23 |

FOREIGN PATENT DOCUMENTS

| | | | |
|---|---|---|---|
| 0103411 | 3/1984 | European Pat. Off. | 350/96.23 |
| 0139166 | 5/1985 | European Pat. Off. | 350/96.23 |
| 3108109 | 9/1982 | Fed. Rep. of Germany | 350/96.23 |
| 86501 | 5/1983 | Japan | 350/96.23 |
| 59-95305 | 1/1984 | Japan | 350/96.23 |
| 2065324 | 6/1981 | United Kingdom | 350/96.23 |
| 2105486 | 3/1983 | United Kingdom | 350/96.23 |
| 2105865 | 3/1983 | United Kingdom | 350/96.23 |
| 2139779 | 11/1984 | United Kingdom | 350/96.23 |

OTHER PUBLICATIONS

Fiber and Integrated Optics, vol. 4, No. 1, "Optical Fiber Cables Using V-Grooved Cylindrical Units & High Performance Cables" pp. 67-94, 1982.

Primary Examiner—Charles T. Jordan
Assistant Examiner—Michael J. Carone
Attorney, Agent, or Firm—Sprung Horn Kramer & Woods

[57] ABSTRACT

An optical fiber cable includes an elongated flexible body having at least two spiral grooves formed in a circumferential surface thereof and extending longitudinally of the body. An optical fiber is received in one of the spiral grooves while an elongated flexible tension member is received in the other spiral groove, the tension member being composed of at least one elongated element made of aramid fibers.

5 Claims, 1 Drawing Sheet 9,804,245

OPTICAL FIBER CABLE

BACKGROUND OF THE INVENTION

1. Field of the Invention

This invention relates to an optical fiber cable which is lightweight and flexible and has a high strength.

2. Prior Art

It has been desired that an optical fiber cable has a smaller diameter and a high strength and is lightweight and flexible. One example of the conventional optical fiber cable comprises an elongated tension member or core made of twisted steel wires, a plurality of optical fibers spirally wound around the tension member, a cushioning member wound around the spirally-wound optical fibers, a holder tape of a plastics material applied around the cushioning member, and a sheath wound around the holder tape. This conventional optical fiber cable is advantageous in that it can has a small diameter. However, it has a relatively low mechanical strength, and besides it is relatively heavy in weight because of the use of the tension member of steel wires.

Another conventional optical fiber cable comprises an elongated body or spacer member made of polyethylene or the like having a plurality of spiral grooves formed in a circumferential surface thereof and extending longitudinally thereof, optical fibers received respectively in some of the spiral grooves, tension wires of steel received respectively in the other grooves, a cushioning member wound around the body, a holder tape of a plastics material applied around the cushioning member, and a sheath wound around the holder tape (Japanese utility Patent Application No. 57-192058 of Ishida et al.). Although this conventional optical fiber cable has an increased strength, it is relatively heavy in weight on account of he use of the steel tension wires and is inferior in flexibility.

SUMMARY OF THE INVENTION

It is therefore an object of this invention to provide an optical fiber cable of the type having an elongated body or spacer member with spiral grooves which cable is lightweight, and possesses a high strength and a good flexibility, and is subjected to less transmission loss due to temperature variations.

According to the present invention, there is provided an optical fiber cable comprising:

(a) an elongated flexible body having at least two spiral grooves formed in a circumferential surface thereof and extending longitudinally of said body;

(b) optical fiber means received in one of said spiral grooves; and (c) an elongated flexible tension member received in the other spiral groove, said tension member comprising at least one elongated element made of aramid fibers.

DESCRIPTION OF THE PREFERRED EMBODIMENTS OF THE INVENTION

Figure 1:
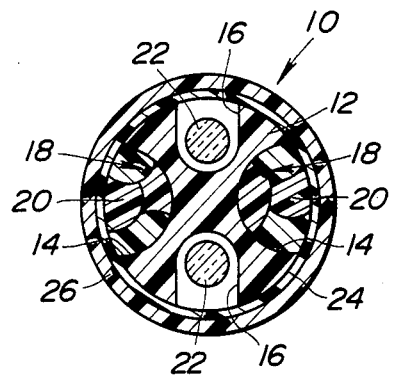
FIG. 1 is a cross-sectional view of an optical fiber cable provided in accordance with the present invention.

The invention will now be described with reference to the drawings in which like reference numerals denote corresponding parts in several views.

An optical fiber cable 10 shown in FIG. 1 comprises an elongated flexible body or spacer member 12 made of a high-density plastics material such as a polyethylene resin, a polypropylene resin and a flame retardant polyethylene resin. The body 12 of a circular cross-section has four or two pairs of grooves 14 and 16 formed in and spirally extending along a circumferential surface thereof, the four grooves being disposed in circumferentially equally spaced relation to each other as viewed in cross-section. The grooves 14 and 16 are disposed alternately, and the grooves 14 have a greater cross-section than the grooves 16.

An elongated flexible tension member 18 is received in each of the pair of diametrically-opposed spiral grooves 14 along an entire length thereof. The tension member 18 comprises a plurality of (five in the illustrated embodiment) elongated elements 20 or strands made of aramid fibers and twisted together. The tension member 18 serves to offer a resistance to tension or a pulling force so that the optical fiber cable 10 can have a high tensile strength. The size of the grooves 14, the number of the aramid fiber elements 20 received therein are determined in accordance with the tensile strength of the optical fiber cable 10 to be obtained. On the other hand, a pair of optical fibers 22 are received respectively in the diametrically opposed spiral grooves 16. As the aramid fibers of which the elements 20 are made, Kevlar manufactured by DuPont or HM-50 sold by Teijin, Japan, can be used.

A holder layer 24 comprises a tape of a plastics material, such as nylon, polyethylene and polyester, wound around the body 12 to hold the tension members 18 in place in the respective grooves 14. The tension member 18 of the aramid fiber elements 20 is compressible and deformable, and it has a size slightly larger than the cross-section of the groove 14 when subjected to no load. Therefore, for assembling the optical fiber cable 10, each tension member 18 is forced into a respective one of the grooves 14, so that its constituent elements 20 of aramid fibers are held in squeezed or compressed condition in the groove 14 by the holder layer 24. Thus, the flexible tension member 18 is filled in the groove 14.

A sheath 26 made of a polyethylene resin, a flame-retardant polyethylene resin or the like is wound around the holder layer 24.

Since the tension member 18 composed of the aramid fiber elements 20 has a higher tensile strength and is less heavy than a steel tension member of the same size, the optical fiber cable 10 can be less heavy in weight and have a higher strength. Therefore, the optical fiber cable 10 can have a higher strength as compared with a conventional one of the same diameter. And, the optical fiber cable 10 can be of a smaller diameter as compared with a conventional one having the same strength. In addition, the tension member 18 composed of the aramid fiber elements 20 is more flexible than a steel tension member of the same size, and therefore the flexibility of the optical fiber cable 10 is enhanced. Further, since the tension member 18 of the aramid fiber elements 20 is compressible, it can be quite intimately fitted in or fully filled in the groove 14, so that the crosssectional area of the groove 14 can be fully used, thereby further increasing the strength of the optical fiber cable.

Further, since the aramid fiber has a negative coefficient of thermal expansion, the expansion and contraction of the optical fiber cable 10 due to temperature variations can be suitably kept to a minimum. As a result, a transmission loss of the optical fiber cable 10 caused by such temperature variations is also kept to a minimum.

Further, the optical fiber cable 10 is made entirely of non-metallic materials and therefore has non-inductive and electrically-insulating properties.

Figure 2:
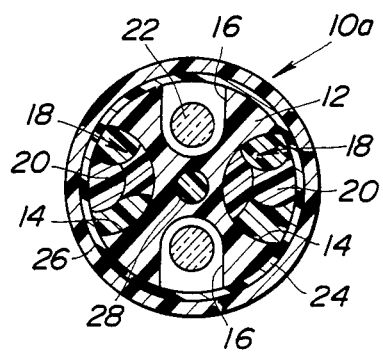
FIG. 2 is a view similar to FIG. 1 but showing a modified optical fiber cable.

FIG. 2 shows a modified optical fiber cable 10a which differs from the optical fiber cable 10 of FIG. 1 only in that an elongated central tension core 28 is embedded or molded in an elongated body 12 at its center and extending along the axis of the body 12. The central core 28 is flexible and is made of, say, two strands of aramid fiber-reinforced plastics material (KFRP), glass fiber-reinforced plastics material, carbon fiber-reinforced plastics material or steel. The use of the central tension core 28 further increases the resistance of the optical fiber cable 10a to tension or a pulling force. Usually, the elongated body or spacer member 12 is molded of such plastics material by extrusion, and, advantageously, the use of the central core 28 greatly facilitates such an extrusion operation. The central core 28 has such a small diameter that it will not adversely affect the flexibility and lightweight of the optical fiber cable 10a.

Figure 3:
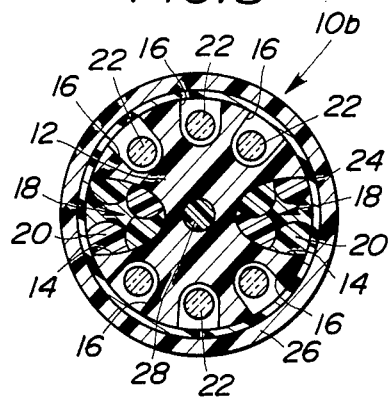
FIG. 3 is a view similar to FIG. 1 but showing another modified optical fiber cable.

FIG. 3 shows another modified optical fiber cable 10b which differs from the optical fiber cable 10a of FIG. 2 in that more than two spiral grooves 16 are provided in the elongated body 12 for receiving a corresponding number of optical fibers 22. In the illustrated embodiment, three pair of spiral grooves 16 are provided, each pair of grooves 16 being disposed in diametrically opposed relation to each other. The central tension core 28 may be omitted.

The invention will now be illustrated by way of the following EXAMPLE.

EXAMPLE

In this EXAMPLE, an optical fiber cable 10a shown in FIG. 2 was prepared to determine its characteristics. The elongated body 12 was made of flame-retardant polyethylene resin and had an outer diameter of 3.3 mm. The pair of spiral grooves 14 for receiving the respective tension members 18 had a width of 1.6 mm while the pair of spiral grooves 16 for receiving the respective optical fibers 22 had a width of 1.0 mm. The central core 28 was composed of two strand each having a size of 1420 denier and made of aramid fiber-reinforced plastics material containing 40% by volume of aramid fiber. Each tension member 18 was composed of five elongated elements 20 twisted together and each having a size of 1420 denier. Each of the pair of optical fibers 22 had a diameter of 0.8 mm. The holder layer 24 comprised a nylon tape and had a thickness of 0.05 mm. The sheath was made of a flame-retardant polyethylene resin and had a thickness of 0.5 mm. The resultant optical fiber cable 10a had a diameter of 4.3 mm and a weight of 14.1 kg/km. The optical fiber cable 10a was tested to determine its mechanical characteristics and temperature characteristics. The results obtained are shown in TABLE below.

TABLE

| Test | | Test conditions | Results |
|---|---|---|---|
| Mechanical characteristics test | Stretching | Stretching rate: 10 mm/min. Distance between two gage marks: 2 m | 0.5% elongation at 65 kg Breakage at 250 kg |
| | Bending | Mandrel of 20 mm diameter Bend angle: 360° Bending frequency: 30 reciprocations | Transmission loss did not increase after 30 reciprocations. Maximum loss increase was 0.07 dB. |
| | Wiping | Die diameter: 40 mm Load: 30, 40, 50, 60 and 80 kg. Wiping frequency: 5 reciprocations Length wiped: 2 m | No breakage after 5 reciprocations at 80 kg. |
| Temperature characteristics test | | Cable length: 100 m Temperature: −60 to +80° | Transmission loss increase: not more than 0.02 dB |

The bending test was carried out by winding the optical fiber cable around the mandrel and pulling the fiber cable back and forth. The transmission loss was measured by a wavelength of 0.85 μm. The tested fiber cable had the optical fiber folded longitudinally intermediate opposite ends thereof and received in the grooves 16 to provide a loop.

As can be seen from TABLE, the tested optical fiber cable exhibited a high tensile strength and excellent temperature characteristics, and was not damaged even when subjected to repeated bending and wiping. Thus, the optical fiber cable is lightweight and has a high strength, a good flexibility and excellent temperature characteristics, and is relatively small in diameter. Therefore, for example, the optical fiber cable according to the present invention can be best suited as a portable type which is to be used outdoors where severe conditions may be encountered.

As described above, the optical fiber cables according to the present invention have the tension members 18 made of aramid fiber elements having a high tensile strength and a low specific gravity, and therefore the optical fiber cable is lightweight and sufficiently flexible and has excellent temperature characteristics. And, the optical fiber cable can have a sufficient strength even if it has a smaller diameter than the conventional optical fiber cables having tension members of steel.

Figure 4:
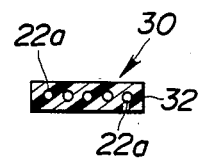
FIG. 4 is a cross-section view of an optical fiber unit incorporated to be in the optical fiber cable.
Figure 5:
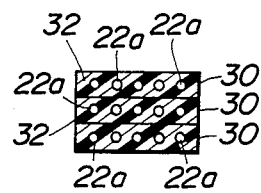
FIG. 5 is a view similar to FIG. 4 but showing a modified optical fiber unit.
Figure 6:
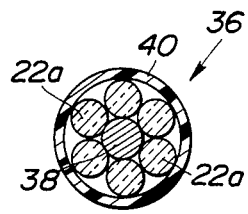
FIG. 6 is a cross-sectional view of another modified optical fiber unit.

While the optical fiber cables according to the present invention have been specifically shown and described herein, the invention itself is not to be restricted by the exact showing of the drawings or the description thereof. For example, as shown in FIG. 4, each of the pair of optical fibers 22 received in the respective spiral grooves 16 may be replaced by a tape-like optical fiber unit 30 comprising a flat base 32 of a synthetic resin and a plurality of optical fibers 22a embedded or molded in the base 32 in parallel juxtaposed relation. Also, each optical fiber 22 may be replaced by a plurality of (three in the illustrated embodiment) tape-like optical fiber unit 30 (FIG. 5). Further, as shown in FIG. 6, each optical fiber 22 may be replaced by an optical fiber unit 36 comprising an elongated core 38, a plurality of optical fibers 22a spirally wound around the core 38 and a sheath 40 covering the optical fibers 22a. Further, although in the illustrated embodiment, the tension member 18 is composed of five elongated elements 20 and filled in the groove 14, it may be composed of at least one elongated element 20.

What is claimed is:

1. An optical fiber cable comprising:
   (a) an elongated flexible body having at least one wider groove and one narrower groove both defined by groove walls formed in a circumferential surface of the flexible body and extending spirally and longitudinally along said body;
   (b) optical fiber means loosely received in said at least one narrower groove;
   (c) at least one elongated flexible tension member received in said at least one wider groove in close adherence to said groove walls, said tension member comprising at least one elongated element made of aramid fibers; and
   (d) an elongated central tension core provided in the elongated flexible body and extending along an axis thereof and made of aramid fiber-reinforced plastic material, 2. An optical fiber cable according to claim 1, in which said tension member comprises a plurality of elongated elements made of aramid fibers and twisted together.

3. An optical fiber cable according to claim 1, in which said tension member is filled in said at least one wider groove in a compressed fashion.

4. An optical fiber cable according to claim 1, in which said elongated body has more than two narrower grooves and more than two wider grooves, a plurality of said optical fiber means and a plurality of said tension members being received in said narrower grooves and said wider grooves respectively.

5. An optical fiber cable according to claim 1, in which said optical fiber means comprises at least one tape-like optical fiber unit comprising a flat base of a synthetic resin and a plurality of optical fibers embedded in the base in juxtaposed relation.

* * * * *